US009426672B2

United States Patent
Shi et al.

(10) Patent No.: US 9,426,672 B2
(45) Date of Patent: Aug. 23, 2016

(54) APPARATUS AND METHODS FOR NETWORK DETECTION AND MITIGATION OF HYBRID CLIENT DEVICE OPERATION

(71) Applicant: Apple Inc., Cupertino, CA (US)

(72) Inventors: Jianxiong Shi, Cupertino, CA (US); Johnson O. Sebeni, Cupertino, CA (US); Li Su, Cupertino, CA (US); Navid Damji, Cupertino, CA (US); Paul V. Flynn, Cupertino, CA (US); Sarma V. Vangala, Cupertino, CA (US); Sreevalsan Vallath, Cupertino, CA (US); Thanigaivelu Elangovan, Cupertino, CA (US); Zhu Ji, Cupertino, CA (US)

(73) Assignee: Apple Inc., Cupertino, CA (US)

(*) Notice: Subject to any disclaimer, the term of this patent is extended or adjusted under 35 U.S.C. 154(b) by 298 days.

(21) Appl. No.: 13/851,016

(22) Filed: Mar. 26, 2013

(65) Prior Publication Data

US 2013/0286853 A1 Oct. 31, 2013

Related U.S. Application Data

(60) Provisional application No. 61/685,891, filed on Mar. 26, 2012.

(51) Int. Cl.
*H04W 24/02* (2009.01)
*H04W 76/02* (2009.01)
(Continued)

(52) U.S. Cl.
CPC ........... *H04W 24/02* (2013.01); *H04W 76/028* (2013.01); *H04L 1/0026* (2013.01); *H04W 48/02* (2013.01); *H04W 72/1215* (2013.01); *H04W 88/06* (2013.01)

(58) Field of Classification Search
CPC .... H04L 5/0055; H04L 5/001; H04L 5/0053
USPC ....................... 370/329, 281, 242; 455/552.1
See application file for complete search history.

(56) References Cited

U.S. PATENT DOCUMENTS

| 2007/0183383 A1* | 8/2007 | Bitran | H04W 88/06 |
| | | | 370/338 |
| 2009/0279517 A1* | 11/2009 | Chin et al. | 370/338 |

(Continued)

FOREIGN PATENT DOCUMENTS

| EP | 2217014 A1 | 8/2010 |
| JP | 2009225061 A | 10/2009 |

(Continued)

OTHER PUBLICATIONS

Turner, S. et al. "cdma2000 Hybrid Access Terminal Operation", Announcement Qualcomm CDMA Technologies, Qualcomm, San Diego, CA, US, Apr. 9, 2001, pp. 1-25.

(Continued)

*Primary Examiner* — Charles C Jiang
*Assistant Examiner* — Will Lin
(74) *Attorney, Agent, or Firm* — Downey Brand LLP

(57) ABSTRACT

Methods and apparatus for network-based detection and mitigation of hybrid client device reception outage events. For example, in one embodiment, a cellular device uses a single-radio solution to support circuit-switched calls on a CDMA 1X network and packet-switched calls on LTE. Periodically, the cellular device tunes away from LTE and monitors CDMA 1X activity, and vice versa. During these tuned-away periods, the network adjusts operation to mitigate adverse effects (e.g., underutilization of radio resources, synchronization loss, etc.).

20 Claims, 3 Drawing Sheets

(51) Int. Cl.
*H04W 60/00* (2009.01)
*H04L 1/00* (2006.01)
*H04W 72/12* (2009.01)
*H04W 88/06* (2009.01)
*H04W 48/02* (2009.01)

(56) References Cited

U.S. PATENT DOCUMENTS

| | | | |
|---|---|---|---|
| 2010/0317357 A1 | 12/2010 | Miki et al. | |
| 2011/0083066 A1* | 4/2011 | Chung | H03M 13/09 714/807 |
| 2011/0158117 A1 | 6/2011 | Ho et al. | |
| 2011/0280206 A1* | 11/2011 | Johansson | H04L 5/0053 370/329 |
| 2011/0292894 A1* | 12/2011 | Wu | H04L 1/1812 370/329 |
| 2012/0008552 A1* | 1/2012 | Baldemair | H04W 52/146 370/328 |
| 2012/0020229 A1 | 1/2012 | Dayal et al. | |
| 2012/0023226 A1 | 1/2012 | Petersen et al. | |
| 2012/0071103 A1 | 3/2012 | Kadous et al. | |
| 2012/0071185 A1* | 3/2012 | Dayal et al. | 455/509 |
| 2012/0127930 A1* | 5/2012 | Nguyen | H04W 74/002 370/329 |
| 2012/0157103 A1* | 6/2012 | Frenger et al. | 455/437 |
| 2012/0252474 A1* | 10/2012 | Tiirola | H04L 5/0048 455/450 |
| 2013/0086206 A1* | 4/2013 | Sultenfuss et al. | 709/217 |
| 2013/0145451 A1* | 6/2013 | Berionne et al. | 726/9 |
| 2013/0172023 A1* | 7/2013 | Chan | H04W 4/14 455/466 |
| 2013/0308535 A1 | 11/2013 | Shichino | |

FOREIGN PATENT DOCUMENTS

| | | |
|---|---|---|
| JP | A2011524140 A | 8/2011 |
| JP | A2013528973 A | 7/2013 |
| WO | 2008/085952 | 7/2008 |
| WO | WO2009057782 A1 | 5/2009 |
| WO | WO2009151257 A2 | 12/2009 |
| WO | WO2011123555 A1 | 10/2011 |
| WO | 2012/162190 | 11/2012 |
| WO | 2013/112848 | 8/2013 |

OTHER PUBLICATIONS

PCT Application No. PCT/US2013/033939—International Search Report and Written Opinion dated Aug. 19, 2013.
Taiwanese Patent Application No. 102110753—Office Action dated Oct. 13, 2014.
Japanese Patent Application No. 2015-503475—Office Action dated Oct. 23, 2015.

* cited by examiner

APPARATUS AND METHODS FOR NETWORK DETECTION AND MITIGATION OF HYBRID CLIENT DEVICE OPERATION

PRIORITY

This application claims priority to co-owned U.S. Provisional Patent Application Ser. No. 61/685,891, filed Mar. 26, 2012 of the same title, which is incorporated herein by reference in its entirety.

RELATED APPLICATIONS

This application is related to co-owned, co-pending U.S. patent application Ser. No. 13/475,482 filed on May 18, 2012, and entitled "APPARATUS AND METHODS FOR CLIENT SERVER INTERACTION IN HYBRID NETWORK ENVIRONMENTS", Ser. No. 13/475,655 filed on May 18, 2012, and entitled "APPARATUS AND METHODS FOR OPTIMIZING SCHEDULED OPERATIONS IN HYBRID NETWORK ENVIRONMENTS", Ser. No. 13/475,802 filed May 18, 2012, and entitled "APPARATUS AND METHODS FOR NETWORK ASSISTED HYBRID NETWORK OPERATION", Ser. No. 13/346,419 filed Jan. 9, 2012, and entitled "DYNAMIC TRANSMIT CONFIGURATIONS IN DEVICES WITH MULTIPLE ANTENNAS", and Ser. No. 13/347,641 filed Jan. 10, 2012, and entitled "MULTIMODE USER EQUIPMENT WITH DUAL CIRCUIT ARCHITECTURE", and Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES". This case is also related to U.S. Provisional Patent Application Ser. No. 61/478,922 filed Apr. 25, 2011, and entitled "DUAL NETWORK MOBILE DEVICE RADIO RESOURCE MANAGEMENT", 61/472,617 filed Apr. 6, 2011, and entitled "MULTIPLE NETWORK MOBILE DEVICE CONNECTION MANAGEMENT", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to operation within heterogeneous wireless systems such as, for example, hybrid network operation in which client devices can communicate using any one of several networks. More particularly, in one exemplary regard, the present disclosure introduces methods and apparatus for network-based detection and mitigation of hybrid client device reception outage events.

2. Description of Related Technology

A cellular network operator provides mobile telecommunications services to the public via a network infrastructure of e.g., cellular base stations (BS), base station controllers, infrastructure nodes, etc. There is a wide variety of cellular network technologies, and historically cellular devices have been specialized for operation within a single cellular network. However, as cellular technologies have become increasingly commoditized, devices are now able to offer so-called "multimode" operation; i.e., a single device that is capable of operation on two or more cellular networks. Multimode operation allows a device to operate on any one of several network technologies, but does not enable operation on multiple network technologies simultaneously.

Incipient research is directed to so-called "hybrid" network operation. During hybrid network operation, the client device operates simultaneously among multiple distinct networks having different technologies. In one exemplary case, a hybrid device can support both: (i) Long Term Evolution (LTE) and (ii) Code Division Multiple Access 1X (CDMA 1X) networks; i.e., the device can maintain a simultaneous connection between a first LTE network and a second CDMA 1X network. For example, a LTE/CDMA 1X hybrid device can conduct a voice call over the CDMA 1X network while the mobile device is in LTE mode. In another exemplary case, a hybrid device can support both: (i) CDMA 1X-EVDO (Evolution Data Optimized) and (ii) CDMA 1X networks.

Existing solutions for hybrid network operation rely on the client device to manage its own operation between networks. Specifically, the client device is responsible for maintaining its active connections to the various service networks; there are no required changes to existing network installations (i.e., hybrid network operation does not affect the legacy hardware and software of the network infrastructure). Client-centric hybrid operation has several benefits. For example, there is very little (if any) infrastructure cost for the network operator. Moreover, hardware costs can be incorporated into the price of consumer devices. Additionally, hybrid network operation will not affect existing legacy devices. Similarly, devices capable of hybrid operation are also capable of normal operation.

However, since existing solutions for hybrid network operation do not require the constituent networks to coordinate with one another, the client device will inevitably experience certain scheduling collisions. For example, in the context of the foregoing example of LTE/CDMA operation, while a mobile device is attached to the first LTE network, it must periodically "tune out" the LTE network to perform CDMA 1X actions (such as decoding the Quick Paging Channel (QPCH) to determine if the device is being paged). If the mobile device is receiving data from the LTE network during the tune out period, this data is lost, which may negatively impact throughput and ultimately user experience. Furthermore, a tuned-out mobile device will miss any broadcasted updated network resource information or control data; this can result in the mobile device being barred from access to the LTE network (at least for a period of time).

Moreover, network resources which are assigned to a tuned-out client device are wasted and/or underutilized.

Thus, improved methods and apparatus are needed to, inter alia, minimize the impact of such tuned-out devices on the network.

SUMMARY

The aforementioned needs are satisfied by providing, inter alia, improved apparatus and methods for detection and mitigation of hybrid client device reception outage events.

Firstly, a method for network-based detection and mitigation of hybrid client device reception outage events is disclosed. In one embodiment, the method includes: determining a reception loss event associated with a client-device; adjusting operation for the client device; monitoring for reception recovery; if reception is recovered, resuming normal operation; and otherwise disconnecting the client device.

An apparatus for network-based detection and mitigation of hybrid client device reception outage events is also disclosed herein. In one embodiment, the apparatus is a network-based entity (e.g., server). In another embodiment, the apparatus is a mobile device such as a smartphone or tablet computer.

In another embodiment, the apparatus includes at least one wireless interface configured for wireless communication via at least first and second wireless technologies, the first technology being different than the second technology; at least one processor in data communication with the at least one wireless interface; and logic in data communication with the at least one processor. In one variant, the logic is configured to: identify the occurrence of a reception loss event associated with a wireless interface of a client device, the wireless interface of the client device being compliant with the second wireless technology; adjust at least one aspect of the operation for the client device, the adjustment comprising adjustment of at least one aspect which will result in reduced network resource utilization by the client device for at least a period of time; monitor for reception recovery by the client device; when reception is recovered, resume operation according to an established protocol; and disconnect the client device when reception is not recovered.

A computer-readable storage apparatus is further disclosed. In one embodiment, the apparatus includes a storage medium having at least one computer program stored thereon, the at least one program being configured to, when executed, cause a computerized device to determine a reception loss event associated with a client-device; adjust operation for the client device; monitor for reception recovery; if reception is recovered, resume normal operation; and otherwise disconnect the client device.

A hybrid network system is also disclosed. In one embodiment, the system includes at least two networks, and at least one network of the hybrid network system prioritizes one or more of its tasks based on high-priority tasks of one or more others of the at least two networks.

A client device capable of hybrid network operation is further disclosed herein. In one embodiment, the client device is a mobile wireless-enabled device one or more air interfaces for communication with multiple different wireless network infrastructures. A client device useful with in a wireless network is also disclosed. In one embodiment, the wireless network is configured to provide network-based detection and mitigation of client device reception outage events, and the client device includes: at least one wireless interface, the at least one interface configured for wireless communication via at least first and second wireless technologies, the first technology being different than the second technology; at least one processor in data communication with the at least one wireless interface; and logic in data communication with the at least one processor. in one variant, the logic is configured to: signal the occurrence or incipient occurrence of a reception loss event associated with the at least one wireless interface to a network entity; receive at least one adjustment of at least one aspect of the operation for the client device, the adjustment comprising adjustment of at least one aspect which will result in reduced network resource utilization by the client device for at least a period of time; and implement the received adjustment.

A method of operating a wireless network entity so as to mitigate wasting of network resources associated with at least one mobile device of the network is also disclosed. In one embodiment, the method includes: receiving one or more communications from the at least one mobile device; evaluating the received one or more communications; inferring from the evaluation that a loss of reception event is incipient for the at least one mobile device; and adjusting operation of at least one of (i) the network, and/or (ii) the at least one mobile device based at least in part on the inference, the adjusting providing the mitigation.

Other features and advantages will immediately be recognized by persons of ordinary skill in the art with reference to the attached drawings and detailed description of exemplary embodiments as given below.

All Figures ©Copyright 2012-2013 Apple Inc. All rights reserved.

DETAILED DESCRIPTION

Figure 1:
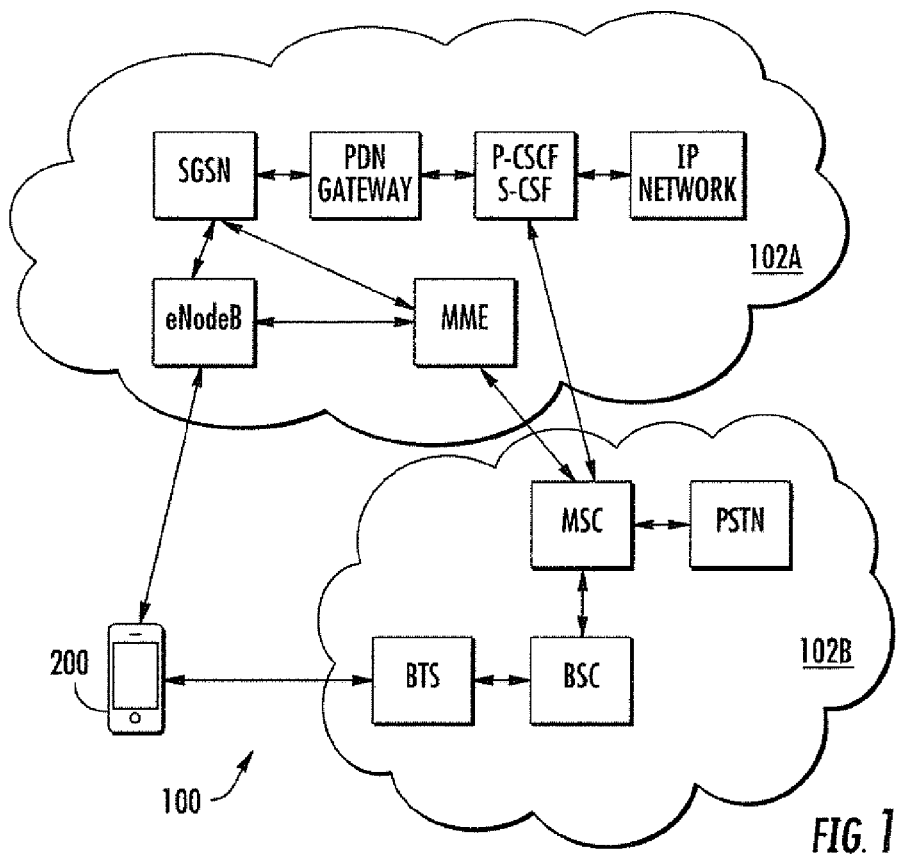
FIG. 1 is a logical block diagram illustrating one exemplary hybrid network system useful in conjunction with various features of the present disclosure.

Reference is now made to the drawings, wherein like numerals refer to like parts throughout.
Detailed Description of Exemplary Embodiments Exemplary embodiments and aspects of the present disclosure are now described in detail. While these embodiments and aspects are primarily discussed in the context of Long Term Evolution (LTE), Code Division Multiple Access 1X (CDMA 1X) cellular networks, and CDMA 1X EVDO (Evolution Data Optimized), it will be recognized by those of ordinary skill that the various features of the present disclosure are not so limited, and can be used with other cellular technologies such as TD-LTE (Time-Division Long-Term Evolution), TD-LTE-Advanced, TD-SCDMA (Time Division Synchronous Code Division Multiple Access) and Global System for Mobile Communications (GSM). In fact, the various features are useful in combination with any network (cellular, wireless, wireline, or otherwise) that can benefit from network-based detection and mitigation of hybrid client device reception outage events.
LTE/CDMA 1X Hybrid Network Operation FIG. 1 illustrates an exemplary hybrid network system 100. The exemplary hybrid network includes a first LTE RAN (radio access network) 102A and a second CDMA 1X RAN 102B in communication with a user equipment (UE) client device 200. As shown in FIG. 1, the LTE RAN and CDMA 1X RAN are unsynchronized, and entirely unaware of the other RAN's operation. In other scenarios, the RANs may have higher levels of coordination; e.g., the RANs may be loosely synchronized, or even tightly synchronized in certain aspects of their operation.

Figure 2:
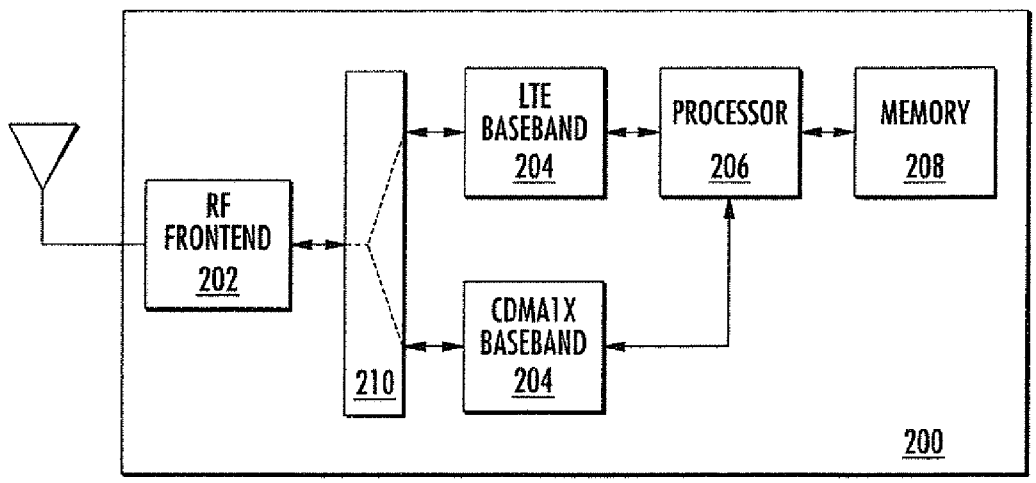
FIG. 2 is a functional block diagram of an exemplary embodiment of a user equipment (UE) apparatus.

Referring now to FIG. 2, the exemplary user equipment (UE) apparatus 200 is illustrated in greater detail. The UE of FIG. 2 may be, for instance, a single-radio solution to support circuit-switched calls on a CDMA 1X network and packet-switched calls on LTE; specifically, the UE has a single Radio Frequency (RF) processing "chain" which is used alternately for CDMA 1X or LTE processing. Specifically, the single RF chain periodically tunes away from LTE and monitors CDMA 1X activity, and vice versa. The UE includes: (i) one or more Radio Frequency (RF) front-ends 202 (e.g., other RF front-ends may be present for other radio access technologies, etc.), (ii) one or more baseband processors 204, and (iii) at least one application processor 206 and associated memor(ies) 208. In various implementations, the RF front-ends and baseband processors may be further specialized to handle a single wireless technology, or generalized to encompass multiple wireless technologies.

As shown, the exemplary UE includes a first RF front-end that is coupled to both first and second baseband processors adapted to interface to a LTE network and CDMA 1X network, respectively. It is further appreciated that the foregoing configuration is purely illustrative, and various implementations may include other cellular technologies such as GSM, GPRS, EDGE, WCDMA, CDMA2000, CDMA 1X EVDO, LTE-A (LTE Advanced), etc. in various combinations. Moreover, while only a single RF front-end is shown for simplicity, it is appreciated that a RF front-end can (and generally will) include multiple receive and/or transmit antennas and/or chains. For example, well known MIMO (Multiple In Multiple Out), SISO (Single In Single Out), MISO (Multiple In Single Out), and SIMO (Single In Multiple Out) antenna configurations are widely used within the related arts, and may be used consistent with the present disclosure.

Additionally, in one exemplary embodiment, the UE 200 further includes a switching fabric 210 that can connect any one (or more) of the baseband processors 204 to various one (or more) of the antennas 202. The illustrated switching fabric is adapted to connect either the LTE baseband or CDMA 1X baseband to the RF front-end. However, common embodiments may connect one baseband processor to one antenna ("one-to-one"), one-to-many, many-to-one, etc. This "switching" capability is desirable for a number of reasons, including inter alia: (i) power management, (ii) processing efficiency/flexibility, and (iii) antenna isolation constraints may require that only a subset of radios of a mobile device are active at any one time. In some small form factor designs, there is not enough space to completely isolate multiple antennas during operation; consequently, only one antenna (or a limited subset) can be active at any time. Similarly, certain form factor designs may reuse antennas for different wireless interfaces, such that only one wireless interface can use a common antenna at any given time. Yet other motivations will be appreciated by those of ordinary skill in the related arts, and are not discussed further herein (e.g., business or profit considerations, network utilization, etc.).

Moreover, it will be appreciated that other components are commonly incorporated within UE 200, but are not discussed further herein. For example, the UE may include user interface components (display screens, buttons, touch screens such as a multi-touch display, dials, etc.), memory components (e.g., RAM (Random Access Memory), Flash, hard disk drives (HDD), etc.), power management components (e.g., batteries, charger components, etc.), and external interfaces (e.g., Fire Wire™, Universal Serial Bus™ (USB), Thunderbolt, etc.).

Furthermore, it should be recognized that the UE depicted in FIG. 2 is merely illustrative of one exemplary embodiment. Still other variants useful with the various features disclosed herein are described with greater detail in co-owned and co-pending U.S. Provisional Patent Application Ser. No. 61/478,922 filed Apr. 25, 2011, and entitled "DUAL NETWORK MOBILE DEVICE RADIO RESOURCE MANAGEMENT", 61/472,617 filed Apr. 6, 2011, and entitled "MULTIPLE NETWORK MOBILE DEVICE CONNECTION MANAGEMENT", and U.S. patent application Ser. No. 13/099,204 filed May 2, 2011, and entitled "SINGLE-RADIO DEVICE SUPPORTING COEXISTENCE BETWEEN MULTIPLE RADIO ACCESS TECHNOLOGIES", Ser. No. 13/346,419 filed Jan. 9, 2012, and entitled "DYNAMIC TRANSMIT CONFIGURATIONS IN DEVICES WITH MULTIPLE ANTENNAS", and Ser. No. 13/347,641 filed Jan. 10, 2012, and entitled "MULTIMODE USER EQUIPMENT WITH DUAL CIRCUIT ARCHITECTURE", each of the foregoing being incorporated herein by reference in its entirety.

The exemplary UE 200 of FIG. 2 is capable of LTE/CDMA 1X hybrid mode operation within, e.g., the hybrid network system of FIG. 1. Specifically, the UE 200 can place CDMA 1X voice calls while registered with the LTE network. During hybrid operation, the UE can be registered to both a LTE network 102A and a CDMA 1X network 102B. The UE is capable of receiving and responding to data and control messaging from either the LTE network or the CDMA 1X network; however, as previously discussed, the UE cannot respond simultaneously to both networks, and hence in the illustrated embodiment is configured to always prioritize CDMA 1X (voice call) traffic over LTE (data) traffic to ensure that user experience for voice calls is unaffected. Other implementations may have other prioritization schemes (e.g., where voice calls are lower priority, based on the type of traffic, historic device usage, QoS requirements, etc.)

Once the UE 200 has connected to the LTE network 102A, the UE will periodically "tune" its radio away from the LTE network to perform CDMA 1X maintenance actions such as acquiring a CDMA 1X cell, registering to the acquired CDMA 1X cell, and receiving CDMA 1X pages, etc. Depending on CDMA 1X network 102B radio conditions, these actions can range in one exemplary implementation from eighty milliseconds (80 ms) up to several seconds (4 s-6 s). Moreover, when the UE receives or places a voice call on the CDMA 1X network, the LTE connection may be dropped. As used hereinafter, the terms "tune-away", "tune-out", etc. are interchangeably used, and similarly the reciprocal terms "tune-in", "tune-back", etc. are interchangeably used. More generally, "tune-away" operation is subsumed in a larger group of client device reception outage events. Specifically, these client device reception outage events are initiated by the client device (with or without network coordination) to intentionally or indirectly disable reception of the client device to achieve some other purpose or goal. Common examples include e.g., to perform measurements on other networks, to reduce power consumption, to reduce interference on other nearby devices, to preserve processing resources for other applications, etc.

Referring back to the exemplary UE 200 of FIG. 2, there are several events that can trigger a tune-away event. Common examples include (without limitation): (i) registration, (ii) location updates, (iii) paging, (iv) search operations, (v) cell measurements, (vi) voice call events (both mobile originated (MO) (i.e., placed by the mobile device), and mobile terminated (MT) (i.e., received by the mobile device)), (vii) out of service (OOS) procedures, etc. Tune-away events may be periodic in nature (or otherwise predictably scheduled), or may be entirely unpredictable, interrupting events, or variants or combinations thereof. The duration of tune-away events widely varies from a few milliseconds to several seconds.

Figure 3:
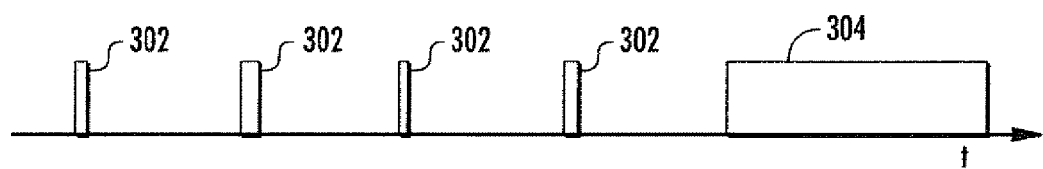
FIG. 3 is a graphical representation of tune-away periods along an exemplary time line, in accordance with one embodiment.

For example, within this context, the UE may periodically tune-away from a LTE network to tune-in to the CDMA 1X network to detect a paging channel, and perform serving cell and neighbor cell measurements of the CDMA 1X network. More rarely, the tune-away event may require a substantially longer time interval to perform lengthy maintenance tasks. For example, one exemplary time line is shown in FIG. 3. As illustrated, over the course of normal operation, the mobile device periodically tunes to the CDMA 1X network for brief time intervals 302. Occasionally, the device must perform much lengthier tasks 304. Common examples of lengthier tasks include, without limitation, Location Area Updates (LAU) where the mobile device must actively exchange information with the CDMA 1X network, periods of poor reception (e.g., the mobile device may need additional time to decode messaging (e.g., paging channels, etc.)), etc.

While the foregoing scenario is discussed in relation to LTE/CDMA 1X capable client devices, it is further appreciated that similar (if not identical) complications arise in other hybrid client devices. For example, other mobile devices may be capable of Time-Division Long-Term Evolution (TD-LTE) and Time Division Synchronous Code Division Multiple Access (TD-SCDMA) technologies. In LTE (also referred to as Frequency Division Duplex LTE (FD-LTE)), the downlink and uplink are transmitted using different frequencies. In Time Division Duplex LTE (TD-LTE), the downlink and the uplink are on the same frequency and the separation occurs in the time domain, so that each direction in a call is assigned to specific timeslots.

Similarly, Time Division Synchronous Code Division Multiple Access (TD-SCDMA) allows traffic to be uplinked (from the mobile terminal to the base station) and downlinked (from the base station to the mobile terminal) using different time slots in the same frame.

Figure 4:
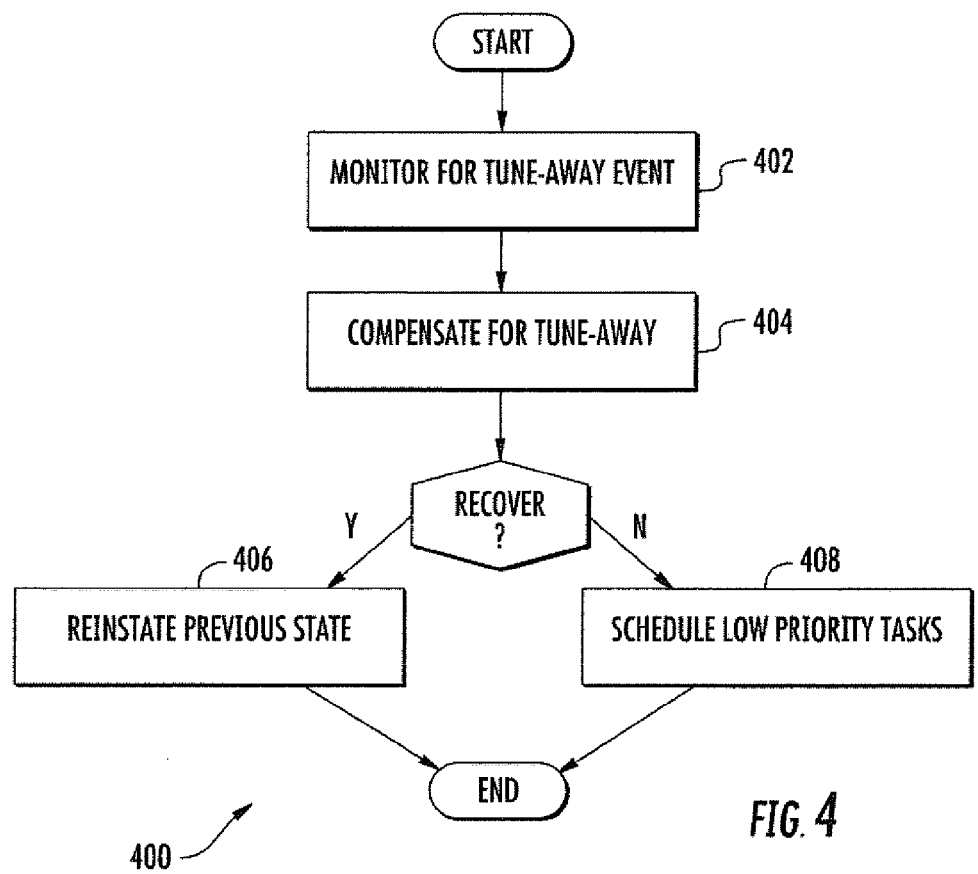
FIG. 4 is a logical flow diagram detailing one embodiment of a method for network-based detection and mitigation of hybrid client device reception outage events.

Embodiments of the present disclosure contemplate the use of these technologies together and separately (in combination with other technologies) in a hybrid network, such as by implementing the methodology described herein with respect to FIG. 4 (except using one or more different combinations of radio access technologies set forth herein). For example, in an exemplary embodiment relating to both TD-LTE and TD-SCDMA, a UE connected to the TD-LTE network will periodically (or on an event driven or other basis) tune its radio away from the TD-LTE network to perform TD-SCDMA actions such as cell selection, registration, and receiving pages.

Moreover, Global System for Mobile Communications (GSM) is a cellular technology standard that has evolved a number of advancements including General Packet Radio Service (GPRS), Enhanced Data rates for GSM Evolution (EDGE), and Universal Mobile Telecommunications System (UMTS) also known as 3G (Third Generation) UMTS. Various other common embodiments may further combine either LTE, or TD-LTE with any of GSM, GPRS, EDGE, UMTS, etc.

Unfortunately, during tune-away operation, the network (e.g., the evolved NodeB (eNB)) may not be aware that the UE is tuned out. This can have significant undesirable effects. For example, the eNB may grant either uplink (UL) resources to the UE (which will be unused), or downlink (DL) resources for transmissions (which will be missed). Similarly, the eNB will not receive Physical Uplink Control Channel (PUCCH) information (e.g., Hybrid Automatic Repeat Request (HARQ) Acknowledgment (ACK)/Non-acknowledgements (NACK); Channel Quality Indication (CQI), Rank Indication (RI), Precoding Matrix Information (PMI), etc.), which may result in unnecessary retransmissions, and/or incorrect or stale information.

More severe consequences may occur when the UE is improperly operating with "stale" information. For example, if the eNB does not receive Sounding Reference Signals (SRS), the eNB may improperly schedule the UE for UL scheduling. Similarly, where the Radio Resource Connection (RRC) inactivity timer expires during tuned away operation, the UE and eNB can lose synchronization. In either circumstance, the UE may transmit control signaling on stale resources (e.g., PUCCH transmissions, SRS transmissions, Physical Random Access Channel (PRACH), etc.) which contributes to overall network pollution.

In still other situations, the UE and the eNB may lose connectivity altogether. This can create a prolonged service blackout for the UE. For example, premature Radio Link Failure (RLF) may result in further synchronization problems, spotty reception, and excessive connection attempts.

Method

Referring now to FIG. 4, one embodiment of a method 400 for network-based detection and mitigation of hybrid client device reception outage events is illustrated. In one scenario, a client device is connected to a first network, where the first network is entirely unaware of the client device's connections to other networks. Alternatively, the first network may have limited information on nearby networks (e.g., timing information, registered devices, etc.) which may be periodically refreshed, but is not integrated within the operational decisions for the first network.

At step 402, the network determines a reception loss event associated with a client-device. In one variant, the reception loss is detected on the basis of one or more signaling exchanges or events which are incomplete and/or not received. In alternate variants, reception loss is detected on the basis of a length of time during which no signaling is received from the client device.

In yet other alternate variants, reception loss events are signaled to the network. In one implementation, the signaling is implicit in one or more existing protocols (that is, by mere invocation of the protocol, a loss event can be inferred). Alternatively, the signaling may be explicit (e.g., using a dedicated message protocol implemented for that purpose, or alternatively an existing message protocol that has been "repurposed" or upon which the necessary signaling is "piggybacked"), or may use a "mixed" approach of implicit and explicit techniques, such as where one of the two is more appropriate to one operating circumstance, and the other technique to another circumstance.

In still other variants, reception loss is based on one or more failed access attempts initiated by the network.

It will also be appreciated that combinations of the foregoing may be used either simultaneously (e.g., two of three implicit/explicit criteria must be met before a "loss" is established), or alternatively in different circumstances (e.g., one criterion or set of criteria in one circumstance, and another in a second circumstance).

At step 404 of the method 400, the network adjusts operation for the client device. In one embodiment, the network adjusts by reserving fewer resources for the client device. Alternatively the network may not reserve any resources for the client device. These actions accomplish reduction in "wasted" network resources; i.e., freeing up resources that would otherwise be allocated to the client but not used.

In one embodiment, the network may deactivate one or more layers of device context. In one exemplary implementation, the one or more layers of device context include state information for one or more communication protocol stack software elements or layers. For example, in one such scenario, the network may deactivate one or more of: a physical software layer, a radio link layer, a medium access (e.g., MAC) layer, etc.

At step 406, the network monitors for reception recovery; if reception is recovered, the network resumes normal operation (which may occur immediately, or after a "wait" or other period to endure that reception has been in fact reliably recovered, so as to e.g., prevent the device from cycling modes repeatedly). In one embodiment, the network and client device negotiate resources for the connected operation. In alternate embodiments, the network and client device resume or re-negotiate one or more layers of device context information. For example, in one such example, the network may reactivate one or more of a physical software layer, a radio link layer, a medium access layer, etc.

In another variant, the network simply defaults to the allocation that was associated with the client immediately before the loss event; this approach advantageously obviates further negotiation between the network and client device.

In one variant, the choice of which of the foregoing techniques to apply is determined based on one or more criteria; e.g., time duration of the loss event. For example, if the loss event duration is comparatively short (say, 100 ms in the example context discussed supra), then the network will choose to reinstitute the prior resource allocation without negotiation. However, when a prescribed threshold is exceeded (say, e.g., 1000 ms or 1 s), then the renegotiation is invoked.

Otherwise, if reception is not recovered (e.g., within a prescribed time window, number of events, cycles, etc., as described with respect to the exemplary embodiments infra), the network disconnects the client device at step 408.

Example Operation

Figure 5:
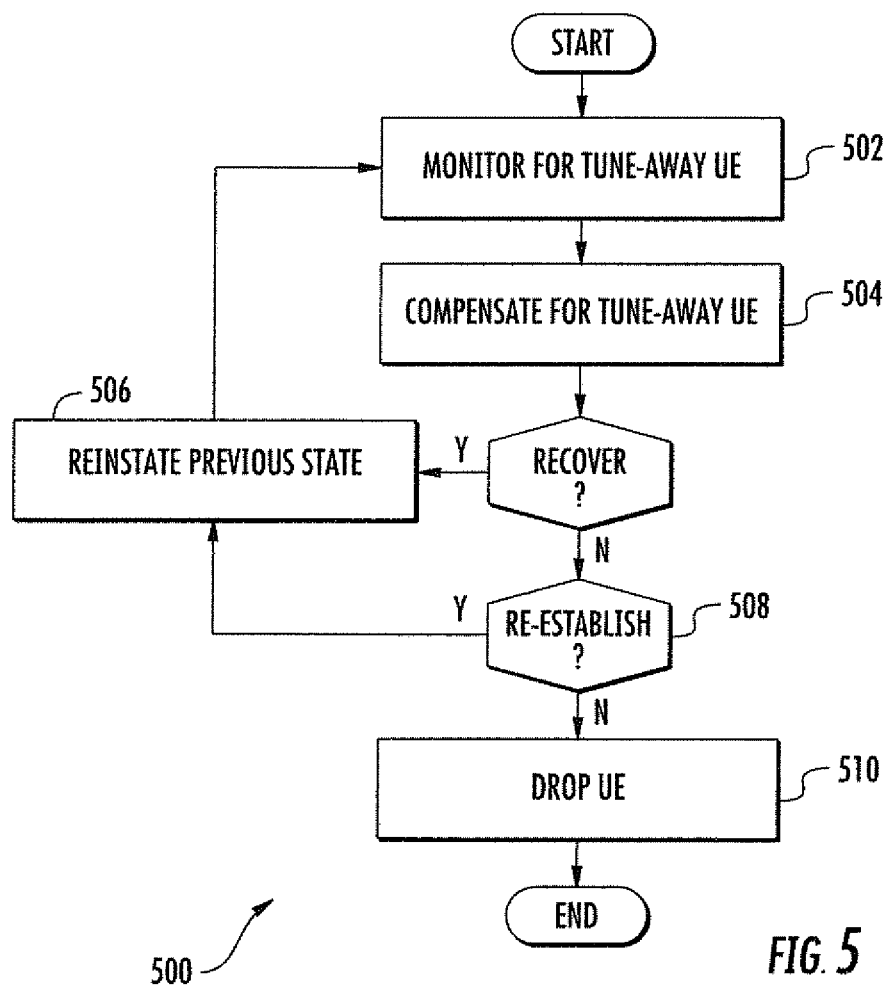
FIG. 5 is a logical flow diagram detailing one exemplary implementation of the method of FIG. 4 in the context of Long Term Evolution network and a Code Division Multiple Access 1X networks.

Referring now to FIG. 5, one exemplary implementation of the method 400 of FIG. 4 is shown and described. Specifically, one exemplary embodiment of a method 500 for network-based detection and mitigation of hybrid client device reception outage events is illustrated.

In one scenario, the hybrid client device is a single-radio solution capable of communicating with a Long Term Evolution (LTE) network and Code Division Multiple Access 1X (CDMA 1X) network. While the following operation is described with reference to the evolved Node B (eNB) of the LTE network, it is readily appreciated that various aspects of the present invention are widely applicable to base stations (regardless of technology), and more generally wireless server devices of any type (e.g., ad hoc networks, etc.)

As a brief aside, during normal operation, the eNB configures the UE with a dedicated Physical Uplink Control Channel (PUCCH) and/or Sounding Reference Signal (SRS) resources during Radio Resource Connection (RRC) setup. The dedicated PUCCH resources enable the UE to transmit one or more of: Scheduling Requests (SR), Channel Quality Indications (CQI), Rank Indications (RI), and/or Precoding Matrix Indexes (PMI). Each PUCCH resource is identified according to, inter alia: location (e.g., time slot, subcarrier), periodicity, and offset of the dedicated resource. Dedicated SRS resources are specified according to a bandwidth, location, periodicity and offset of the dedicated resource.

Existing eNBs can determine if a PUCCH and/or SRS has not been recovered from a UE. Generally, this capability is broadly categorized under Discontinuous Transmission (DTX) detection. Common solutions for DTX detection exhibit various degrees of success according to, inter alia: implementation algorithms, channel conditions, and neighbor cell interference.

Referring to FIG. 5, at step 502, the eNB monitors for a UE tune-away event. In one exemplary embodiment, the eNB monitors for one or more missed PUCCH and/or SRS signals e.g., via DTX detection.

In some variants, the eNB monitors for multiple missed PUCCH and/or SRS (e.g., one or more DTX occurrences). Checking for multiple DTX occurrences can ensure that the UE is actually tuned away (as opposed to just a momentary loss of reception caused by e.g., a deep fade). The number of consecutive DTX may be selected on the basis of a tradeoff between the time to detect a true tune-away with no UL transmission, and the probability of a false alarm (based on the eNB PUCCH/SRS DTX). In some embodiments, the tradeoff may be dynamically adjusted to optimize according to e.g., the probability of success, the probability of misdetection, overall detection time, etc. In one such variant, once the eNB has detected a DTX event, the eNB starts a timer function (e.g., DTX_Monitoring_Timer). In one implementation, the length of the DTX_Monitoring_Timer has a maximal upper limit (e.g., such that Radio Link Failure (RLF) is not declared during the DTX monitoring timeout).

In some implementations, the UE can explicitly or implicitly communicate with the eNB to provide information on an upcoming tune-away period. For example, in one such case, the eNB is implicitly signaled via existing messaging schemes. The eNB may infer an upcoming tune-away period if, for instance, the UE transmits a number of consecutive CQI measurements with a pre-determined value on PUCCH/PUCCH resources (e.g., a null value or zero value CQI is currently reserved and indicates that no defined Modulation and Coding Scheme (MCS) can be supported given the spectral efficiency estimation).

In another such example, the eNB may infer an upcoming tune-away period when the UE transmits a number of consecutive Buffer State Reports (BSR) with a null (or zero) value on the available UL grant.

In still other examples, the eNB may infer an upcoming tune-away period based on a number of consecutive Power Headroom (PHR) reports with a specified value (e.g., LTE has a lowest PHR value of −23 dBm). It is appreciated that detection of a tune-away event may also be based on any combinations of the foregoing.

In one implementation, if the DTX_Monitoring_Tuner expires before receiving UE activity, then the eNB treats the UE as a tuned-away UE, and proceeds to step 504. Alternately, if the DTX_Monitoring_Timer does not expire (e.g., UE activity occurs before timer expiration), then the eNB considers the UE as momentarily interrupted (i.e., no corrective action is necessary).

Referring to step 504, the eNB can compensate for the tuned-away UE by implementing one or more corrective actions.

In one exemplary embodiment, the eNB starts a timer function (e.g., Tune-away_Release_Timer). The Tune-away_Release_Timer is selected in one exemplary implementation on the basis of a tradeoff between the time to detect a UE recovery, and the probability of a complete disconnection. In some embodiments, this tradeoff may be dynamically adjusted to optimize according to e.g., maximize the tune-away time, minimize reconnection time, minimize time for reconnection in the event of actual reception loss, etc. In one such variant, once the eNB has detected a tune-away event, the eNB starts another timer (e.g., Tune-away_ Release_Timer).

Common examples of corrective actions include e.g. and without limitation: (i) suspending the scheduling of the UE, (ii) suspending the RRC_Inactivity_Timer (if running), (iii) suspending the C-DRX_Inactivity_Timer (Connected DRX operation) (if running), (iv) suspending RRC procedures (e.g., handover operation, radio link monitoring, re-establishment, etc.) (if running), (v) suspending various software stack components (e.g., Medium Access Control (MAC), Radio Link Control (RLC), Packet Data Convergence Protocol (PDCP) layers) (if running), and/or (vi) releasing any (or a portion of) physical layer dedicated resources (e.g., time slots, subcarriers, resource blocks, etc.).

At decision point 505 of the method 500, the eNB monitors for UE recovery. If the UE recovers, then the eNB proceeds to step 506. Alternately, if the Tune-away_ Release_Timer expires without activity, then the eNB proceeds to step 508 for eNB initiated recovery. Alternately, if the Tune-away_Release_Timer expires without activity, then the eNB may proceed directly to step 510 (and hence dropping the UE).

In one variant, the eNB monitors for Random Access Channel (RACH) operation. If the UE initiates a RACH attempt, then the eNB will service the UE reinstate the UE via the procedure of step 506; otherwise, the eNB proceeds to step 508.

In another variant, the eNB monitors for PUCCH and/or SRS accesses from the UE, alternately or additionally, the eNB may also monitor RACH procedures from the tuned-away UE. In one exemplary embodiment, if a minimum threshold of consecutive PUCCH and/or SRS are detected, then the eNB can consider the UE to be tuned back to the LTE network. For RACH type embodiments, if the UE initiates a RACH procedure which is successful, then the eNB will consider the UE to be tuned back to the LTE network.

Referring now to step 506, the eNB reinstates the UE's previous state. Reinstatement of operation may include, without limitation: (i) resuming scheduling of the UE, (ii) resuming the RRC_Inactivity_Timer (if suspended), (iii) resuming the C-DRX_Inactivity_Timer (if suspended), (iv) resuming RRC procedures (e.g., handover operation, radio link monitoring, re-establishment, etc.) (if suspended), (v) resuming any halted software stack components (e.g., Medium Access Control (MAC), Radio Link Control (RLC), Packet Data Convergence Protocol (PDCP) layers), and/or (vi) setting up any physical layer dedicated resources (e.g., time slots, subcarriers, resource blocks, etc.).

Finally, at step 508, the eNB may attempt to re-establish connection to the UE. If the UE responds to the eNB's re-establishment attempt, then the eNB can reinstate the UE at step 506. If the re-establishment attempt fails, then the eNB can drop the UE altogether (step 510). For example, in one exemplary embodiment, the eNB sends a Physical Downlink Control Channel (PDCCH) message, if the UE is "tuned in", then the UE will responsively initiate a RACH attempt and the eNB can proceed to step 506. If the eNB does not receive the RACH, then the eNB proceeds to step 510. It will also be appreciated that the eNB may be configured to apply various retry and/or timeout logic to the foregoing process; e.g., n number of retries and/or expiration of a timer before proceeding to step 510.

At step 510, the eNB drops the UE (when the connection cannot be re-established). In one embodiment, this includes: releasing any dedicated radio resources, removing the UE from the eNB active UE database, transitioning the UE to RRC_IDLE operation, and releasing any signaling and data radio bearers.

Apparatus

Figure 6:
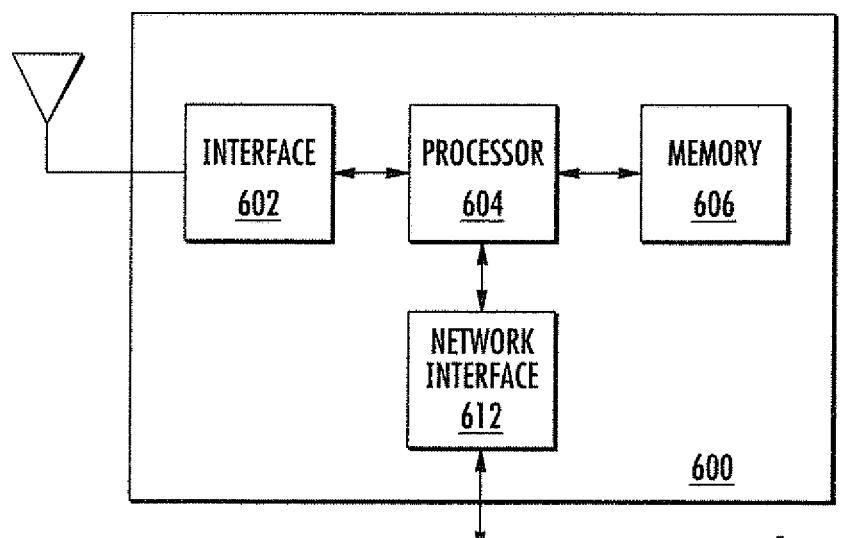
FIG. 6 is a functional block diagram of an exemplary embodiment of a wireless network apparatus useful for implementing various of the methods of the disclosure.

FIG. 6 illustrates one exemplary embodiment of a network entity 600 configured in accordance with the present disclosure. The network entity may be a stand-alone entity, or be incorporated with other network entities (e.g., a base station, a base station controller, a radio access network controller, etc.). In one exemplary embodiment, the network entity includes a Long Term Evolution (LTE) evolved Node B (eNB).

As shown in FIG. 6, the network entity 600 generally includes a wireless (e.g., cellular) interface 602 for interfacing with cellular devices, a processor 604, and a storage apparatus 606. The cellular interface is shown as a wireless cellular interface configured for communication with one or more mobile devices, although other configurations and functionalities may be substituted. For example, in alternate embodiments, the cellular interface may be a wireline communication to a base station, where the base station is in communication with the mobile device.

The cellular interface 602 of the apparatus 600 shown in FIG. 6 at a high level includes one or more radio transceiver circuits configured to transmit and receive data via radio frequency transmissions (RF). Common embodiments of a radio transceiver generally include a modem processor, and one or more antennas. In one exemplary embodiment of the present invention, the radio transceiver is configured in accordance with Long Term Evolution (LTE) radio access technologies. It is recognized that various other implementations of the present invention may be configured for other cellular and/or wireless standards. Common examples of such technologies include: GSM, GPRS, EDGE, WCDMA, CDMA2000, CDMA 1X, CDMA 1X-EVDO, LTE-A, etc. and various combinations thereof.

During normal operation, the aforementioned cellular interface 602 adjusts detects and mitigates hybrid client device reception outage events.

The processor 604 includes one or more processors (or multi-core processor(s)). Additionally, the processor is coupled to processing memory and/or the storage apparatus. Common implementations of the processing subsystem are implemented within signal processors, general processors, network processors, field programmable gate arrays (FPGAs), digital signal processors (DSPs), and any combination of the foregoing. Typical implementations of memory and storage apparatus include Random Access Memory (RAM) and variations thereof (Dynamic RAM, Static RAM, Synchronous RAM, etc.), Flash memory, and Hard Disk Drives (HDD). Moreover, it is further appreciated that one or more memory apparatus may further be configured in various redundancy schemes (e.g., Redundant Arrays of Inexpensive Drives (RAID)), etc.

In one exemplary embodiment, the network entity 600 is further coupled to a wired network infrastructure via a network interface 612. The network interface is generally adapted for use with Ethernet networks, although other suitable network variations include Synchronous Optical Networking (SONET), Asynchronous Transfer Mode (ATM), MoCA, etc. Various forms of physical interface are widely used within the related arts, including for example Ethernet cable (e.g., CAT5), coaxial, fiber optics, etc.

It will be recognized that while certain features of the disclosure are described in terms of a specific sequence of steps of a method, these descriptions are only illustrative of the broader methods, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure.

While the above detailed description has shown, described, and pointed out novel features as applied to various embodiments, it will be understood that various omissions, substitutions, and changes in the form and details of the device or process illustrated may be made by those skilled in the art. The foregoing description is of the best mode presently contemplated. This description is in no way meant to be limiting, but rather should be taken as illustrative of the general principles of the disclosure.

What is claimed is:

1. A wireless network apparatus configured for network-based detection and mitigation of hybrid client device reception outage events, the wireless network apparatus comprising:
   at least one wireless interface that is configurable for wireless communication with one or more client devices;
   at least one processor in data communication with the at least one wireless interface; and
   logic in data communication with the at least one processor, the logic configured to cause the wireless network apparatus to:
   identify an occurrence of a reception loss event associated with a wireless interface of a client device, the wireless interface of the client device being compatible with the at least one wireless interface of the wireless network apparatus;
   adjust at least one aspect of an operation for the client device that results in reduced network resource utilization by the client device for a period of time;
   monitor whether the client device recovers reception during the period of time;
   resume normal operation for the client device according to an established protocol, when the client device recovers reception during the period of time;
   attempt to re-establish connection with the client device, when the client device does not recover reception during the period of time; and
   release dedicated radio resources for the client device after the period of time, when the client device does not recover reception or does not re-establish connection during the period of time.

2. The wireless network apparatus of claim 1, wherein the wireless network apparatus adjusts the at least one aspect of the operation for the client device by allocating no resources to the client device for the period of time.

3. The wireless network apparatus of claim 1, wherein the wireless network apparatus adjusts the at least one aspect of the operation for the client device by changing an allocation of at least one of a Physical Uplink Control Channel (PUCCH) resource or a Sounding Reference Signal (SRS) resource to the client device.

4. The wireless network apparatus of claim 1, wherein the wireless network apparatus adjusts the at least one aspect of the operation for the client device by deactivating one or more layers of a client device context that comprises state information for one or more communication protocol stack software elements or layers.

5. The wireless network apparatus of claim 4, wherein the one or more layers comprise one or more of: (i) a physical software layer, (ii) a radio link layer, or (iii) a medium access control (MAC) layer.

6. The wireless network apparatus of claim 1, wherein the at least one wireless interface comprises a code division multiple access (CDMA) based technology or-an orthogonal frequency division multiplexing (OFDM) based technology.

7. The wireless network apparatus of claim 6, wherein:
   the OFDM based technology comprises a Long Term Evolution (LTE) compliant technology,
   the wireless network apparatus is associated with an enhanced Node B (eNB) of an LTE network, and
   the wireless network apparatus monitors whether the client device recovers reception during the period of time by monitoring for recovery of at least one of: (i) a Physical Uplink Control Channel (PUCCH) data element, or (ii) a Sounding Reference Signal (SRS) data element, from the client device.

8. A method for network-based detection and mitigation of hybrid client device reception outage events, the method comprising:
   at a wireless network apparatus:
   identifying an occurrence of a reception loss event associated with a wireless interface of a client device;
   adjusting at least one aspect of an operation for the client device that results in reduced network resource utilization by the client device for a period of time;
   monitoring whether the client device recovers reception during the period of time;
   resuming normal operation for the client device according to an established protocol, when the client device recovers reception during the period of time;
   attempting to re-establish connection with the client device, when the client device does not recover reception during the period of time; and
   releasing dedicated radio resources for the client device after the period of time when the client device does not recover reception or does not re-establish connection during the period of time.

9. The method of claim 8, wherein the reception loss event comprises a loss of reception by the wireless interface of the client device resulting from a tune-away event performed by the client device.

10. The method of claim 9, wherein the tune-away event is performed pursuant to a prescribed protocol within a Long Term Evolution (LTE) technology standard with which the client device is compliant.

11. The method of claim 8, wherein the wireless network apparatus identifies the occurrence of the reception loss event by evaluating one or more communications received from the client device.

12. The method of claim 11, wherein the one or more communications comprise a plurality of consecutive channel quality index (CQI) measurements comprising an uplink control value or a shared channel value having a null value or a zero value.

13. The method of claim 11, wherein the one or more communications comprise a plurality of consecutive Buffer State Reports (BSR) that include a null value or a zero value for an available uplink grant.

14. The method of claim 11, wherein the one or more communications comprise a plurality of consecutive Power Headroom (PHR) reports with a prescribed value.

15. A client device comprising:
at least one wireless interface configurable for wireless communication via at least a Code Division Multiple Access 1X (CDMA 1X) technology and a Long Term Evolution (LTE) technology;
at least one processor in data communication with the at least one wireless interface; and
logic in data communication with the at least one processor, the logic configured to cause the client device to:
  signal, to a network entity, an occurrence or an incipient occurrence of a reception loss event associated with the at least one wireless interface via an existing message protocol re-purposed to signal the reception loss event;
  receive, from the network entity, at least one adjustment of an operation of the client device, the at least one adjustment of the operation of the client device- resulting in reduced network resource utilization by the client device for a period of time;
  implement the at least one adjustment of the operation of the client device for the period of time;
  resume normal operation with the network entity according to an established protocol, when recovering reception with the network entity during the period of time; and
  attempt to re-establish connection with the network entity, when not recovering reception with the network entity during the period of time.

16. The client device of claim 15, wherein the client device signals the occurrence or the incipient occurrence of the reception loss event to the network entity by at least sending one or more communications to the network entity.

17. The client device of claim 16, wherein the one or more communications comprise a plurality of consecutive channel quality index (CQI) measurements comprising an uplink control value or a shared channel value having a null value or a zero value.

18. The client device of claim 16, wherein the one or more communications comprise a plurality of consecutive Buffer State Reports (BSR) that include a null value or a zero value for an available uplink grant.

19. The client device of claim 16, wherein the one or more communications comprise a plurality of consecutive Power Headroom (PHR) reports with a prescribed value.

20. A computer readable apparatus comprising a non-transitory storage medium storing instructions for providing network-based detection and mitigation of client device reception outage events, the instructions, when executed on a processor, cause a client device to:
  select a type of message protocol, wherein types of message protocols comprise a dedicated message protocol and an existing message protocol re-purposed to signal a reception loss event;
  signal, to a network entity, an occurrence or an incipient occurrence of the reception loss event associated with at least one wireless interface of the client device by sending one or more communications based on the selected type of message protocol;
  receive, from the network entity, at least one adjustment of an operation of the client device, the at least one adjustment of the operation of the client device resulting in reduced network resource utilization by the client device for a period of time;
  implement the at least one adjustment of the operation of the client device for the period of time;
  resume normal operation with the network entity according to an established protocol, when recovering reception with the network entity during the period of time; and
  attempt to re-establish connection with the network entity, when not recovering reception with the network entity during the period of time.

\* \* \* \* \*